(12) United States Patent
Singh et al.

(10) Patent No.: US 7,913,007 B2
(45) Date of Patent: Mar. 22, 2011

(54) SYSTEMS, METHODS, AND COMPUTER READABLE MEDIA FOR PREEMPTION IN ASYNCHRONOUS SYSTEMS USING ANTI-TOKENS

(75) Inventors: Montek Singh, Chapel Hill, NC (US); Manoj Kumar Ampalam, Redmond, WA (US)

(73) Assignee: The University of North Carolina, Chapel Hill, NC (US)

( * ) Notice: Subject to any disclaimer, the term of this patent is extended or adjusted under 35 U.S.C. 154(b) by 152 days.

(21) Appl. No.: 12/240,938

(22) Filed: Sep. 29, 2008

(65) Prior Publication Data
US 2009/0119483 A1    May 7, 2009

Related U.S. Application Data

(60) Provisional application No. 60/995,541, filed on Sep. 27, 2007.

(51) Int. Cl.
*G06F 13/42* (2006.01)
(52) U.S. Cl. ........ 710/105; 710/107; 710/119; 370/224; 370/450; 370/451; 370/452; 712/10; 712/42; 712/200; 712/201
(58) Field of Classification Search .............. 710/105, 710/29, 107, 112, 119; 712/42, 10, 200, 712/201; 326/93, 94, 95, 112, 121; 370/224, 370/450, 451, 452
See application file for complete search history.

(56) References Cited

U.S. PATENT DOCUMENTS

| 5,386,585 | A | * | 1/1995 | Traylor | ............................ 712/29 |
| 5,572,690 | A | | 11/1996 | Molnar et al. | |
| 5,600,848 | A | | 2/1997 | Sproull et al. | |
| 5,732,233 | A | * | 3/1998 | Klim et al. | ..................... 712/200 |
| 5,920,899 | A | * | 7/1999 | Chu | .............................. 711/169 |
| 6,028,453 | A | | 2/2000 | Kong | |
| 6,067,417 | A | * | 5/2000 | Wise et al. | ....................... 712/18 |
| 6,590,424 | B2 | * | 7/2003 | Singh et al. | ..................... 326/93 |
| 6,867,620 | B2 | * | 3/2005 | Singh et al. | ..................... 326/121 |
| 6,958,627 | B2 | * | 10/2005 | Singh et al. | ..................... 326/93 |

(Continued)

FOREIGN PATENT DOCUMENTS
EP    0 913 768 A2    5/1999

(Continued)

OTHER PUBLICATIONS

Brej, Charles. Early Output Logic and Anti-Tokens. Sep. 2005.*

(Continued)

*Primary Examiner* — Matthew D Spittle
(74) *Attorney, Agent, or Firm* — Jenkins, Wilson, Taylor & Hunt, P.A.

(57) ABSTRACT

Systems, methods, and computer program products for preemption in asynchronous systems using anti-tokens are disclosed. According to one aspect, configurable system for constructing asynchronous application specific integrated data pipeline circuits with preemption includes a plurality of modular circuit stages that are connectable with each other and with other circuit elements to form multi-stage asynchronous application specific integrated data pipeline circuits for asynchronously sending data and tokens in a forward direction through the pipeline and for asynchronously sending anti-tokens in a backward direction through the pipeline. Each stage is configured to perform a handshaking protocol with other pipeline stages, the protocol including receiving either a token from the previous stage or an anti-token from the next stage, and in response, sending both a token forward to the next stage and an anti-token backward to the previous stage.

11 Claims, 10 Drawing Sheets

U.S. PATENT DOCUMENTS

| | | | |
|---|---|---|---|
| 7,053,665 B2 * | 5/2006 | Singh et al. | 326/121 |
| 7,478,222 B2 * | 1/2009 | Fant | 712/10 |
| 2002/0069347 A1 | 6/2002 | Singh et al. | |

FOREIGN PATENT DOCUMENTS

| | | |
|---|---|---|
| WO | WO 01/82053 A2 | 11/2001 |
| WO | WO 01/82064 A2 | 11/2001 |
| WO | WO 01/95089 A2 | 12/2001 |

OTHER PUBLICATIONS

Sokolov et al. Asynchronous Data Path Models. IEEE. 2007.*

Gill et al. Performance Estimation and Slack Matching for Pipelined Asynchronous Architectures with Choice. IEEE. 2008.*

Ampalam et al. Counterflow Pipelining: Architectural Support for Preemption in Asynchronous Systems using Anti-Tokens. ACM. ICCAD '06. Nov. 9, 2006.*

Notice of Allowance and Fee(s) Due for U.S. Appl. No. 10/380,137 (Jul. 29, 2005).

Notice of Allowance and Fee(s) Due for U.S. Appl. No. 10/380,137 (Mar. 14, 2005).

International Application Serial No. PCT/US01/29721 International Search Report (Sep. 21, 2001).

Ebergen, "Squaring the FIFO in GasP," Proceedings, Seventh International Symposium on Advanced Research in Asynchronous Circuits and Systems (ASYNC 2001), pp. 194-205, IEEE Computer Society Press (Mar. 11-14, 2001).

Sutherland et al., "GasP: A Minimal FIFO Control," In Proceedings on International Symposium on Advanced Research on Asynchronous Circuits and Systems (ASYNC), pp. 46-53, IEEE Computer Society Press (Mar. 2001).

Singh et al., "MOUSETRAP: Ultra High-Speed Transition-Signaling Asynchronous Pipelines," ACM "Tau-00" Workshop, ACM Workshop on Timing Issues in the Specification and Synthesis of Digital Systems (Dec. 4-5, 2000). [This is the same as U.S. Appl. No. 60/242,587].

Molnar et al., "Simple Circuits that Work for Complicated Reasons," Proceedings in International Symposium on Advanced Research on Asynchronous Circuits and Systems (ASYNC), pp. 138-149 (Apr. 2000).

Singh et al., "Fine-Grained Pipelined Asynchronous Adders for High-Speed DSP Applications," In IEEE Computer Soicety Annual Workshop on VLSI, IEEE Computer Society Press (Apr. 27-28, 2000).

Schuster et al., "Asynchronous Interlocked Pipelined CMOS Circuits Operating at 3.3-4.5 GHz," Proceedings of the International Solid State Circuits Conference (Feb. 2000).

Singh et al., "High-Throughput Asynchronous Pipelines for Fine-Grain Dynamic Datapaths," In Proceedings of the International Symposium on Advanced Research in Asynchronous Circuits and Systems ("Async2000") (Apr. 2-6, 2000).

Hauck et al., "Two-Phase Asynchronous Wave-Piplines and Their Application to a 2D-DCT," Proceedings in International Symposium on Advanced Research on Asynchronous Circuits and Systems, (ASYNC) (Apr. 1999).

Molnar et al., "Two FIFO Ring Performance Experiments," Proceedings of the IEEE, vol. 87, No. 2, pp. 297-307 (Feb. 1999).

Van Berkel et al., "Scanning the Technology: Applications of Asynchronous Circuits," Proceedings of the IEEE, vol. 87, No. 2, pp. 223-233 (Feb. 1999).

Dooply et al., "Optimal Clocking and Enhanced Testability for High-Performance Self-Resetting Domino Pipelines," ARVLSI (1999).

Mukherjee et al., Wave Sterring in YADDs: A Novel Non-Iterative Synthesis and Layout Technique, Proc. DAC (1999).

van Gageldonk et al., "An Asynchronous Low-Power 80C51 Microcontroller," Proceedings in International Symposium on Advanced Research on Asynchronous Circuits and Systems (ASYNC), pp. 96-107 (1998).

Harris et al., "Skew-Tolerant Domino Circuits," IEEE Journal of Solid-State Circuits, vol. 32, No. 11, pp. 1702-1711 (Nov. 1997).

Nowick et al. "Speculative Completion for the Design of High-Performance Asynchronous Dynamic Adders," In 1997 IEEE International Symposium on Advanced Research in Asynchronous Circuits and Systems, pp. 210-223 (Apr. 1997).

Narayanan et al., "Static Timing Analysis for Self Resetting Circuits," Proc. ICCAD, pp. 119-126 (1996).

Yee et al., "Clock-Delayed Domino for Adder and Combinational Logic Design," Proceeding ICCD, pp. 332-337 (Oct. 1996).

Furber et al., "Four-Phase Micropipeline Latch Control Circuits," IEEE TVLSI, vol. 4, No. 2, pp. 247-253 (Jun. 1996).

Yun et al., "High-Performance Asynchronous Pipelines Circuits," Proceedings International Symposium on Advanced Research on Asynchronous Circuits and Systems (ASYNC) (1996).

Day et al., "Investigation Into Micropipeline Latch Design Styles," IEEE Transactions on Very Large Scale Integration, vol. 3, No. 2, pp. 264-272 (Jun. 1995).

Borah et al., "High-Throughput and Low-Power DSP Using Clocked-CMOS Circuitry," Proceedings in International Symposium on Low-Power Design, pp. 139-144 (1995).

Davis et al., "Asynchronous Circuit Design: Motivation, Background, and Methods," Asynchronous Digital Circuit Design, Birtwistle et al., (eds.), Workshops in Computing, Springer-Verlag, pp. 1-49 (1995).

Furber, "Computing Without Clocks: Micropipelining the ARM Processor," Asynchronous Digital Circuit Design, Workshops in Computing Birtwistle et al., (eds.) Springer-Verlag, pp. 211-262 (1995).

McLaughlin et al., "A Static Technique for High-Speed CMOS State Machine Design," ASIC Conference and Exhibit, 1994 Proceedings, Seventh Annual IEEE International Rochester, NY USA Sep. 19-23, 1994, New York, NY, USA IEEE, pp. 108-111, XP010140513 ISBN: 0-7803-2020-4 the whole document (Sep. 19, 1994).

Liu at al., "A 250-MHz Wave Pipelined Adder in 2-μm CMOS," IEEE JSSC, vol. 29, No. 9, pp. 1117-1128 (Sep. 1994).

Wong et al., "Designing High-Performance Digital Circuits Using Wave-Pipelining," IEEE Transactions on Computer-Aided Design of Integrated Circuits and Systems, vol. 12, No. 1, pp. 24-46 (Jan. 1993).

Williams, "Self-Timed Rings and Their Application to Division," Ph.D. Thesis, Stanford University (May 1991).

Sutherland, "Micropipelines," Communications of the ACM, vol. 32, No. 6, pp. 720-738 (Jun. 1989).

Seitz, "System Timing," Introduction to VLSI Systems, Chapter 7, Med et al., (eds.), Addison-Wesley (1980).

* cited by examiner

SYSTEMS, METHODS, AND COMPUTER READABLE MEDIA FOR PREEMPTION IN ASYNCHRONOUS SYSTEMS USING ANTI-TOKENS

PRIORITY CLAIM

This application claims the benefit of U.S. Provisional Patent Application Ser. No. 60/995,541, filed Sep. 27, 2007; the disclosure of which is incorporated herein by reference in its entirety.

GOVERNMENT INTEREST

This presently disclosed subject matter was made with U.S. Government support under Contract No. KT3408 awarded by the Defense Advanced Research Projects Agency (DARPA). Thus, the U.S. Government has certain rights in the presently disclosed subject matter.

TECHNICAL FIELD

The subject matter described herein relates to methods and systems for implementing pipelined processing. More particularly, the subject matter described herein relates to systems, methods, and computer readable media for counterflow pipelining: preemption in asynchronous systems using anti-tokens.

BACKGROUND

As synchronous designs are increasingly facing challenges due to fundamental limitations of clocking, the VLSI design community has recently turned towards asynchronous logic to mitigate the challenges of global clock distribution in large complex high-speed systems. Asynchronous design offers several potential benefits, such as lower power consumption, higher performance, greater robustness, and significantly better modularity, all of which make asynchronous circuits a promising alternative to synchronous design.

When the problems that arise when using a global synchronous clock became apparent, the VLSI community started looking towards solving problems in asynchronous domain due to its inherent advantages. The main difference in the synchronous and asynchronous ideologies is the way timing between various modules is maintained. In a synchronous pipeline, for example, clocking gives a timing reference which dictates the completion of different stages. In asynchronous pipelines, timing is inferred by communication between the adjacent stages in the pipeline. This is referred to as handshaking. Handshaking protocols define the control behavior of asynchronous pipeline.

There are many areas where asynchronous circuits dominate their synchronous counterparts. Lower emissions of electromagnetic noise, no clock distribution (saving area and power), no clock skew, robustness to environmental variations (e.g. temperature and power supply) or transistor variations, better modularity and better security are just some of the properties for which most asynchronous designs have shown advantages over synchronous ones.

There are many different flavors of asynchronous design. However, the most commonly used approaches differ mainly in the following design choices.

Data signaling/encoding. In dual rail encoded data, each Boolean (i.e., two-valued signal) is implemented as two wires, typically a data signal and a clock signal. This allows the value and the timing information to be communicated for each data bit. Bundled data, on the other hand, has one wire for each data bit and a separate wire to indicate the timing.

Control signaling/handshaking. Level sensitive circuits typically represent a logic one by a high voltage and a logic zero by a low voltage. Transition signaling uses a change in the signal level to convey information.

Timing model. A speed independent design is tolerant to variations in gate speeds but not to propagation delays in wires while a delay insensitive circuit is tolerant to variations in wire delays as well.

The most popular form in recent years has been dual-rail encoding with level sensitive signaling. Full delay insensitivity is still achieved, but there must be a "return to zero" phase in each transaction, and therefore more power is dissipated than with transition signaling. The advantage of this approach over transition signaling is that the logic processing elements can be much simpler; familiar logic gates process levels whereas the circuits required to process transitions require state and are generally more complex.

FIG. 1 illustrates another conventional approach, which uses bundled data with a transition signaled handshake protocol to control data transfers. FIG. 1 shows the interface between a sender 100 and a receiver 102. Sender 100 and receiver 102 may be two stages of a multi-stage pipeline, for example. A bundle of data, such as databus 104, carries information, typically using one wire for each bit. A request signal (REQ) 106 is sent by the sender to the receiver and carries a transition when the data is valid. An acknowledge signal (ACK) 108 is sent from the receiver to the sender and carries a transition when the data has been used.

The protocol sequence is also shown as the timing diagram at the bottom of FIG. 1. At time T1, sender 100 places valid data on databus 104. At time T2, after some delay sufficient to allow the signals on databus 104 to stabilize, sender 100 causes a transition to occur on REQ 106. Receiver 102 may use the transition of REQ 106 to internally capture (e.g., latch) the values on databus 104. At time T3, after some delay sufficient to allow receiver 102 to guarantee that the data on databus 104 has been properly latched, receiver 102 may cause a transition to occur on ACK 108, to indicate to sender 100 that the data has been successfully received by receiver 104, after which time sender 100 may "release" the data, meaning that sender 100 need not maintain the valid data on databus 104. In some cases, sender 100 may stop driving databus 104, sometimes referred to as "tri-stating" the bus.

This approach has some disadvantages, however. Existing handshake protocols dictate a unidirectional flow of information. Given two adjacent stages, these protocols define one of the stages as active and the stage as passive. Only the active stage can initiate a communication with the passive stage. As used herein, the term "forward" refers to the direction that data is traveling as it passes through the pipeline, and the term "backward" refers to the opposite direction from forward. In conventional pipelines, initiation signals, such as REQ 106 can only travel forward, and response signals, such as ACK 108, can only travel backward. Though these protocols have enabled building complex pipelines, their unidirectional nature has become a bottleneck in implementing certain useful architectural concepts, such as speculation, preemption, and eager evaluation. These concepts will now be described with reference to a simple example, described below and illustrated in FIG. 2.

Consider the following example: a simple application consisting of an if-then-else statement.

```
IF <CONDITION> THEN
    <IF BRANCH>
ELSE
    <ELSE BRANCH>
END IF
```

In the conventional control-driven approach, designing an asynchronous circuit for the above application would involve first computing the condition and then taking the if or else branch accordingly. The control is returned after the whole operation is completed. If α represents the time to compute the CONDITION, β represents the time to perform the operations within the IF block, and γ represents the time to perform the operations within the ELSE block, then the cycle time is α+β if the condition is TRUE and α+γ if the condition is FALSE. Where p is the probability that the condition will be TRUE, the average cycle time $T_{AVG}$ is given by the equation:

$$T_{AVG}=\alpha+p\beta+(1-p)\gamma$$

As used herein, the term "speculation" refers to the execution of code or the performance of a process even though it is not known at the time whether the process is necessary or whether the results of the process will be used. Speculation may be performed by pipelines that have multiple parallel pipeline paths. Using the IF-THEN-ELSE example above, all the three operations—evaluating the condition, executing the IF branch, and executing the ELSE branch—can be performed in parallel using three separate, parallel pipelines. Since the branch outcome is not known until the condition is computed, both the IF and ELSE branches are speculatively executed and the appropriate result is selected based on the condition outcome.

As used herein, the term "preemption" refers to the cancelling of operations or a sequence of operations during execution of the operation or before the operation has been executed. In the IF-THEN-ELSE example, once the CONDITION has been evaluated, the unneeded branch may be preempted, e.g., the operations of the unneeded branch can be terminated if currently being executed or cancelled before execution has begun.

As used herein, the term "eager evaluation" refers to the evaluation of a CONDITION before all of its inputs are known. For example, if the CONDITION being evaluated includes an OR operation, and if one input to an OR operation is a logical 1, the output of the OR operation is known to be a logical 1 and thus the results of the OR operation can be forwarded to the next stage without waiting to receive the other input(s). Similarly, if one input to an AND operation is a logical 0, the output of the AND is known to be logical 0 regardless of the values of the other input(s). In either scenario, it would be unnecessary to evaluate, or wait for the completion of an ongoing evaluation of, the other terms of the OR/AND operation.

FIG. 2 is a block diagram illustrating a conventional transition signaling asynchronous pipeline implementation that does not support counterflow anti-tokens, which is disclosed in U.S. Pat. No. 6,958,627. Pipeline 200 consists of multiple stages 202, two of which are shown in FIG. 2 as stage$_{N-1}$ 202A and stage$_N$ 202B. In one embodiment, each stage 202 includes a data latch 204 for latching incoming data 206, and a latch controller 208, which implements the latch enable logic. Latch controller 208 has 2 inputs, a request signal (REQ) 210 generated by the current stage and an acknowledgment signal (ACK) 212 from an adjacent stage, and outputs a latch enable signal 214. The function of latch controller 208 is to disable latch 204 when the inputs of latch controller 208 don't match, e.g., when a request has not been acknowledged. In one embodiment, latch controller 208 may be implemented using a simple XNOR gate 216.

In one embodiment, latch 204 remains transparent when its stage 202 is waiting for data. As soon as data enters the stage, the data is captured by closing the latch behind it. The latch reopens when the data held by the latch is captured by the subsequent stage. This allows requests (along with data) to flow in the forward direction and their acknowledgments in the backward direction.

In one embodiment, the request signal generated by one stage is also both the request signal sent to the next stage and the acknowledge signal sent to the previous stage. For example, in the embodiment illustrated in FIG. 2, REQ 210 for stage$_N$ 204 is also both ACK for stage$_{N-1}$ 202 and REQ for stage$_{N+1}$ (not shown). In conventional pipeline architectures, the signal wires are typically named based on the type of signal they carry. All the forward flowing signals carry requests and all the reverse flowing signals carry acknowledgments.

FIG. 3 illustrates an abstract picture of such a design that implements speculation but not preemption or early evaluation. The boxes represent operations performed by the circuit. Related operations are connected by lines, and connected boxes represent a sequence of operations. For pipelines, each operation may be performed by separate circuits. Thus, the boxes may represent separate hardware stages, such as sender 100 and receiver 102, and the lines may represent the combination of REQ 106, ACK 108, and databus 104 as shown in FIG. 1, above. For clarity, the boxes are hereinafter referred to generically as "stages".

In the example shown in FIG. 3, stage 300 represents the detection of an IF-THEN-ELSE construct and the subsequent creation of multiple, parallel operations. A stage that creates multiple, parallel operations is referred to as a "fork". Line 302 represents the sequence of operations required to evaluate the CONDITION. Line 304 represents the sequence of operations performed by the IF branch. Line 306 represents the sequence of operations performed by the ELSE branch. Stage 308 represents the completion of the CONDITION evaluation and resulting selection of the results of one branch or the other, e.g., the results of sequence 304 or sequence 306. A state that coalesces the results of multiple, parallel operations is referred to as a "join". The abstract example illustrated in FIG. 3 is intended to show that each branch may involve different, and sometimes vastly different, numbers of operations.

During execution of the simple IF-THEN-ELSE example shown above, the pipeline will perform operations from each branch in parallel. For example, the first stages in sequences 302, 304, and 306 will be performed at the same time, the second stages in sequences 302, 304, and 306 will be performed at the same time, and so on.

Thus, the throughput of such a pipeline is limited by the mismatches in depths of the two branches. Let $N_{IF}$ be the number of stages in the IF branch and $N_{ELSE}$ be the number of stages in the ELSE branch. Assuming $N_{IF} \leq N_{ELSE}$, the cycle time of the given pipeline is given by the equation:

$$T_{CYCLE}=(N_{ELSE}/N_{IF})\times(\text{the cycle time of a given stage})$$

For example, if the IF and ELSE branches are perfectly matched, i.e., having the same number of stages, a pipeline having a 100 nS cycle time will produce a new output every (N/N)×100 nS=100 nS, i.e., every 1 cycle. However, if the IF branch has 4 stages and the ELSE branch has 5 stages, the pipeline will produce a new output every (5/4)×100 nS=125 nS, i.e., every 1.25 cycles. In other words, it can be said that the pipeline will produce a valid result during only 4 out of every 5 clock cycles. During the 1 out of every 5 clock cycles, the 4 stage pipe waits for the 5 stage pipe to finish; while it is waiting, it cannot accept as input the next operation.

The main drawback of the above design is that the final stage has to wait until all branches are computed even if some are not required. In part, this is due to the unidirectional nature of conventional pipeline designs, as illustrated in FIG. 1. Even though stage 308 may quickly determine whether the CONDITION branch returns TRUE or FALSE, stage 308 cannot act on that information since all initiating signals may only travel forward, and stage 308 has no choice but to wait until it receives all REQ signals from the last blocks of stages 302, 304, and 306, respectively. Furthermore, once the CONDITION has been evaluated, the operations of the non-selected branch are no longer needed, but stage 308 has no mechanism by which it can command the pipeline stages currently dedicated to performing those operations to discontinue processing of those operations. Thus, not only must stage 308 wait longer than necessary in some circumstances, the pipeline expends power to perform unnecessary operations.

Preemption is a technique that can overcome this disadvantage of conventional pipelines. One proposed method to implement preemption is to add the ability to send commands in the "backward" direction, referred to herein as "anti-tokens". Referring again to the example illustrated in FIG. 3, once stage 308 has evaluated the CONDITION, it knows whether to disregard the results of the IF branch 304 or the ELSE branch 306. Stage 308 could then issue an anti-token backwards along the unneeded branch. Once the anti-token is received by a stage, the stage would cancel the operation and/or discard the result.

FIG. 4 compares the operation of a conventional pipeline 400 without anti-tokens to the operation of a conventional counterflow pipeline 402 which uses anti-tokens to implement preemption. The filled circles represent tokens, which flow in the forward direction through a pipeline, and empty circles represent anti-tokens, which flow in the backward direction through a pipeline. The flow of tokens and anti-tokens is represented as a sequence of views of the pipeline at various times T1 through T6, arranged from top to bottom of FIG. 3. The sequence of views illustrating the operation of pipeline 400 is on the left side of FIG. 3, and the sequence of views illustrating the operation of counterflow pipeline 402 is on the right side of FIG. 3. Within each single view, tokens flow from left to right and anti-tokens flow from right to left. The IF branch operations are represented by stages S2 and S3, the CONDITION evaluation is represented by stage S4, and the ELSE branch operations are represented by stages S5~S8.

At time T1, stage S1 has detected an IF-THEN-ELSE construct and prepares to perform the calculations of the CONDITION, IF branch, and ELSE branch in parallel. S1 issues tokens to the first stage of each branch, namely stage S2 of the IF branch, stage S4 of the CONDITION branch, and stage S5 of the ELSE branch. In this example, the operation of pipelines 400 and 402 are identical at time T1.

At time T2, stage S2 has completed its operation and sends a token to stage S3. Stage S4 has completed evaluation of the CONDITION, and sends a token to stage S9, indicating the results of the CONDITION. In this example, the result is TRUE, meaning that only the IF branch need be processed and the ELSE branch need not be performed. At time T2 also the operation of pipelines 400 and 402 are identical.

At time T3, the operation of pipelines 400 and 402 begin to differ significantly. Pipeline 400 simply continues to wait for the completion of the IF and ELSE branches. The last stage of the IF branch, stage S3 sends a token containing the result of the IF branch operations to stage S9, but stage S9 cannot use that result, i.e., forward that result to the next stage, until it receives a token from the ELSE branch. Thus, pipeline 400 must wait during time T4 and time T5 while the ELSE branch completes its operation. Not until time T6 can stage S9 of pipeline 400 forward the results of the IF branch on to the next stage in the process.

In contrast, at time T3, stage S9 of counterflow pipeline 402 has determined, based on the results of the CONDITION branch, that the ELSE branch is superfluous, and this issues an anti-token into last stage of the ELSE branch, stage S8. At time T4, stage S9 of counterflow pipeline 402 may proceed to the next stage by forwarding the results of the IF branch on to the next stage in the process. Meanwhile, the anti-token passed backwards from stage S8 to stage S7 meets the token passed forwards from stage S7 to stage S8, cancelling the operation that would have been performed by stage S8 during time T5. Counterflow pipeline 402 performs the operation in less time and reduces power consumption by stage S8.

In another scenario, the each of the three branches may be split into two or more parallel sub-branches, each sub-branch calculating part of a logical CONDITION equation. In this scenario, if stage 308 has the ability to perform eager evaluation, additional time and/or power may be saved.

In this way, the use of anti-tokens provides the means by which pipelined systems can implement preemption, speculation, and eager evaluation. In general, the counterflow approach is useful for three key applications:

Pre-emption. An instruction that has received an exception can pass on information in a counterflow manner to any subsequently issued instructions to pre-maturely kill themselves before switching onto the exception handling routine.

Speculation. In general, control flow constructs, including conditional branches, switch and case statements, multiplexers with varying input delays, etc., are cases where speculation can improve throughput of an asynchronous pipeline.

Eager Evaluation. Applications range from a simple logic gate to a complex Boolean function. If the latencies of the input branches differ by a large amount, an anti-token can be propagated backward and the result validated immediately. Early output implementations allow logic to evaluate results before all inputs are presented. The results move to the next stage, but the current stage stalls while waiting for the late inputs to arrive simply to acknowledge them. This unnecessary wait can be removed by allowing backwards propagating anti-tokens to remove the late inputs. The use of anti-tokens and improved semi-decoupled latches allows the removal of many stalls due to unnecessary synchronizations, thus improving the performance of the circuit. Although the speed improvement might be sought after, the area and power consumption costs are high.

The idea of issuing an anti-token along the unwanted branch is useful in two ways. First, it aids in increasing the throughput by reducing the cycle time. Second, it aids in energy savings by preventing the unwanted requests flowing through the pipeline and hence preventing unwanted computations.

However, one disadvantage with conventional implementations of counterflow pipelines in general, and with conventional asynchronous counterflow pipelines in particular, is the problem of metastability.

As used herein, the term "metastability" refers to the transient, unstable but relatively long-lived state of a logic circuit (or any physical system). This occurs when a system that is designed to perform one action in response to one input and perform another action in response to another input is confronted with both inputs simultaneously, and must decide which action to perform. In logic circuits, metastability can cause unwanted glitches, which can lead to undesirable effects. Metastability is a characteristic of conventional asynchronous counterflow pipelines because each stage has to make a decision depending on whether it received a token or an anti-token. More specifically, the behavior of conventional counterflow pipelines will change depending on whether it received a token or an anti-token. In other words, conventional counterflow pipelines must choose between two possible actions to perform.

For example, referring again to FIG. 4, pipeline 402 issues an anti-token during time T3 and at time T4, the anti-token is traveling from stage S8 to stage S7 while at the same time the token is traveling from stage S7 to stage S8. For conventional asynchronous counterflow pipeline designs, the relative timing of the token and anti-token is critical. If the token arrives at a stage before the anti-token arrives at the same stage, the data is sent forward. If the anti-token arrives at a stage before the token arrives at the same stage, incoming data from the previous stage is not accepted. If the token and anti-token arrive simultaneously, the stage must decide between two actions: whether to send the data forward or to reject the data. Furthermore, conventional asynchronous circuit implementations can glitch under certain timing scenarios, and rely on certain timing assumptions for correct behavior. Both mechanisms give rise to metastability.

One approach to solving the metastability problem involves maintaining two separate pipelines, one for tokens and the other for anti-tokens. However, this approach is expensive in terms of hardware complexity, chip area, and power consumption. Additional circuitry is required to ensure that the two pipelines are synchronized.

Another approach to solving the metastability problem involves adding arbitration logic to determine which signal arrived first. This approach also is expensive in terms of hardware complexity, chip area, and power consumption due to the requirement of an arbitration circuit at every stage.

Accordingly, in light of these disadvantages associated with conventional implementations of asynchronous counterflow pipelines, there exists a need for improved systems, methods, and computer readable media for preemption in asynchronous systems using anti-tokens.

SUMMARY

According to one aspect, configurable system for constructing asynchronous application specific integrated data pipeline circuits with preemption includes a plurality of modular circuit stages that are connectable with each other and with other circuit elements to form multi-stage asynchronous application specific integrated data pipeline circuits for asynchronously sending data and tokens in a forward direction through the pipeline and for asynchronously sending anti-tokens in a backward direction through the pipeline. Each stage is configured to perform a handshaking protocol with other pipeline stages, the protocol including receiving either a token from the previous stage or an anti-token from the next stage, and in response, sending both a token forward to the next stage and an anti-token backward to the previous stage.

According to another aspect, the subject matter described herein includes a method for preemption in asynchronous systems using anti-tokens. The method includes, at an asynchronous pipeline stage for receiving tokens sent in a forward direction from a previous stage, receiving anti-tokens sent in a backward direction from a next stage, sending anti-tokens in a backward direction to the previous stage, and sending tokens in a forward direction to the next stage: receiving at least one of a token from the previous stage and an anti-token from the next stage; and in response to receiving the at least one of a token from the previous stage and an anti-token from the next stage, sending a token to the next stage and sending an anti-token to the previous stage.

The subject matter described herein for preemption in asynchronous systems using anti-tokens may be implemented in hardware, software, firmware, or any combination thereof. As such, the terms "function" or "module" as used herein refer to hardware, software, and/or firmware for implementing the feature being described. In one exemplary implementation, the subject matter described herein may be implemented using a computer readable medium having stored thereon computer executable instructions that when executed by the processor of a computer perform steps.

Exemplary computer readable media suitable for implementing the subject matter described herein include disk memory devices, chip memory devices, programmable logic devices, and application specific integrated circuits. In addition, a computer program product that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings, wherein like reference numerals represent like parts, of which.

DETAILED DESCRIPTION

In accordance with the subject matter disclosed herein, systems, methods, and computer program products are provided for preemption in asynchronous systems using anti-tokens. The subject matter disclosed herein includes a novel approach to asynchronous counterflow designs that addresses the metastability problem that can arise when two inputs arrive simultaneously and it must be decided which input arrived first. The metastability problem is solved by avoiding the decision making altogether. The approach described herein can be used to efficiently implement several useful architectural concepts, such as speculation, preemption, and eager evaluation, in asynchronous hardware systems.

In conventional pipelines, for any given pair of stages, only one stage can initiate communication with the other. By contrast, in counterflow pipelines each stage can initiate communication with the other stage. In other words, for any given pair of stages, each stage in the pair may issue a request to the other stage in the pair, and the other stage will issue an acknowledgement of the request back to the requesting stage.

In counterflow pipelining, special commands, called anti-tokens, can be propagated in a direction opposite to that of data, allowing certain computations to be killed before they are completed. The case during which both the stages initiate requests simultaneously is a special one and can be treated on an application-specific basis, as will be described below. Specific examples of how this kind of a counter flow nature will help in supporting speculation, preemption and eager evaluation paradigms in asynchronous circuits will also be described in more detail below.

To avoid confusion about which direction a signal is flowing, signals may be named using a notation that indicates the direction of a signal. Hereinafter, the following notation will be used: All the forward flowing signals are named $F_i$ and backward flowing signals are named $B_i$. Data signals flow only in the forward direction. Data input to a stage is $data_{i-1}$, and its data output is $data_i$. Specifically, the control signals controlled by stage i are $F_i$ and $B_i$. In general, information flowing in the forward direction is called a token and information flowing in the reverse direction is called an anti-token.

Figure 5:
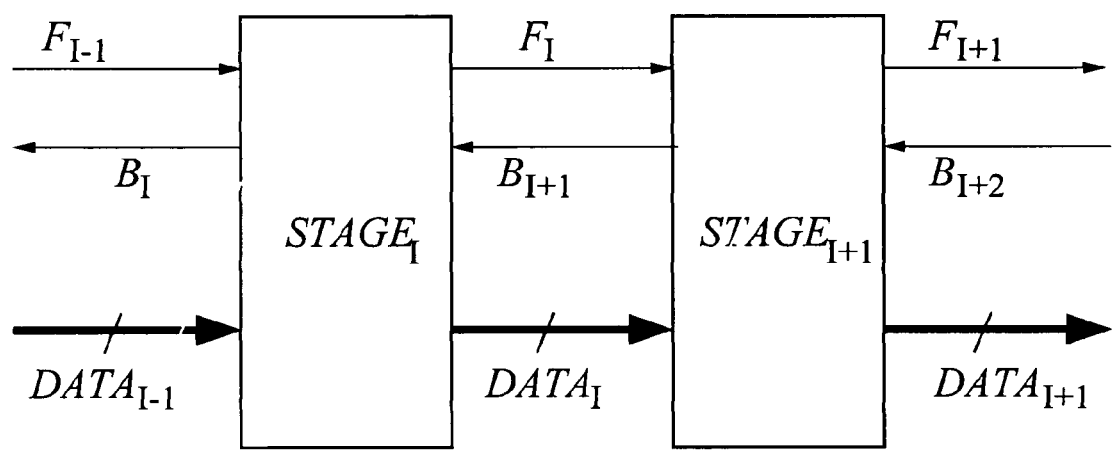
FIG. 5 is a block diagram illustrating a portion of an asynchronous counterflow pipeline according to an embodiment of the subject matter described herein.

FIG. 5 is a block diagram illustrating a portion of an asynchronous counterflow pipeline according to an embodiment of the subject matter described herein, with components labeled using the notation described above. A stage is said to be idle when no tokens or anti-tokens are being processed. For designs using transition signaling (2-phase), in one embodiment, the idle state may correspond to all the control signals being in the same state (either zero or one).

Using the notation convention described above, tokens and anti-tokens may be associated with the states of the control signals. In Table 1, below, a "0" indicates that a signal has not changed and a "1" indicates that a signal has changed, e.g., undergone a transition, changed logic state, etc.

TABLE 1

Relationship Between Signal Inputs and State

| $F_{i-1}$ | $B_{i+1}$ | STATE |
|---|---|---|
| 0 | 0 | Idle |
| 1 | 0 | Token received |
| 0 | 1 | Anti-token received |
| 1 | 1 | Both Token and Anti-token received |

For a stage in the Idle state, a transition on input $F_{i-1}$, indicates that a token has been received. When this happens, the state of the input $F_{i-1}$, signal will be different from signals $F_i$, $B_i$, and $B_{i+1}$. The stage can then acknowledge the token by toggling $B_i$, signal and send the token forward to the next stage by toggling the $F_i$ signal.

For a stage in the Idle state, a transition on input $B_{i+1}$, indicates that an anti-token has been received. When this happens, the state of the input $B_{i+1}$, signal will be different from signals $F_{i-1}$, $F_i$, and $B_i$. The stage can then acknowledge the anti-token by toggling $F_i$ signal and send the anti-token backward to the previous stage by toggling the $B_i$ signal.

It is important to note that toggling a signal wire may imply different actions. Specifically, when a stage toggles its $F_i$ signal, it either means sending a token or acknowledging an anti-token. When a stage toggles its $B_i$ signal, it either means sending an anti-token or acknowledging a token.

The protocol works as follows. In an idle state, a stage can receive either a token or an anti-token. If the stage receives a token, the stage sends an acknowledgment of the token backwards to the previous stage and simultaneously sends the token forward to the next stage. Similarly, if the stage receives an anti-token, the stage sends an acknowledgement of the anti-token forward to the next stage and simultaneously sends the anti-token backward to the previous stage. After sending a token forward or sending an anti-token backward, a stage cannot accept a new token or an anti-token until an acknowledgment, corresponding to the forwarded token or the anti-token, is received.

When a stage receives a token and an anti-token simultaneously, the stage may treat the received anti-token as the acknowledgment to the token that will be sent forward, or the stage may treat the received token as the acknowledgment to the anti-token that will be sent backward.

Figure 6:
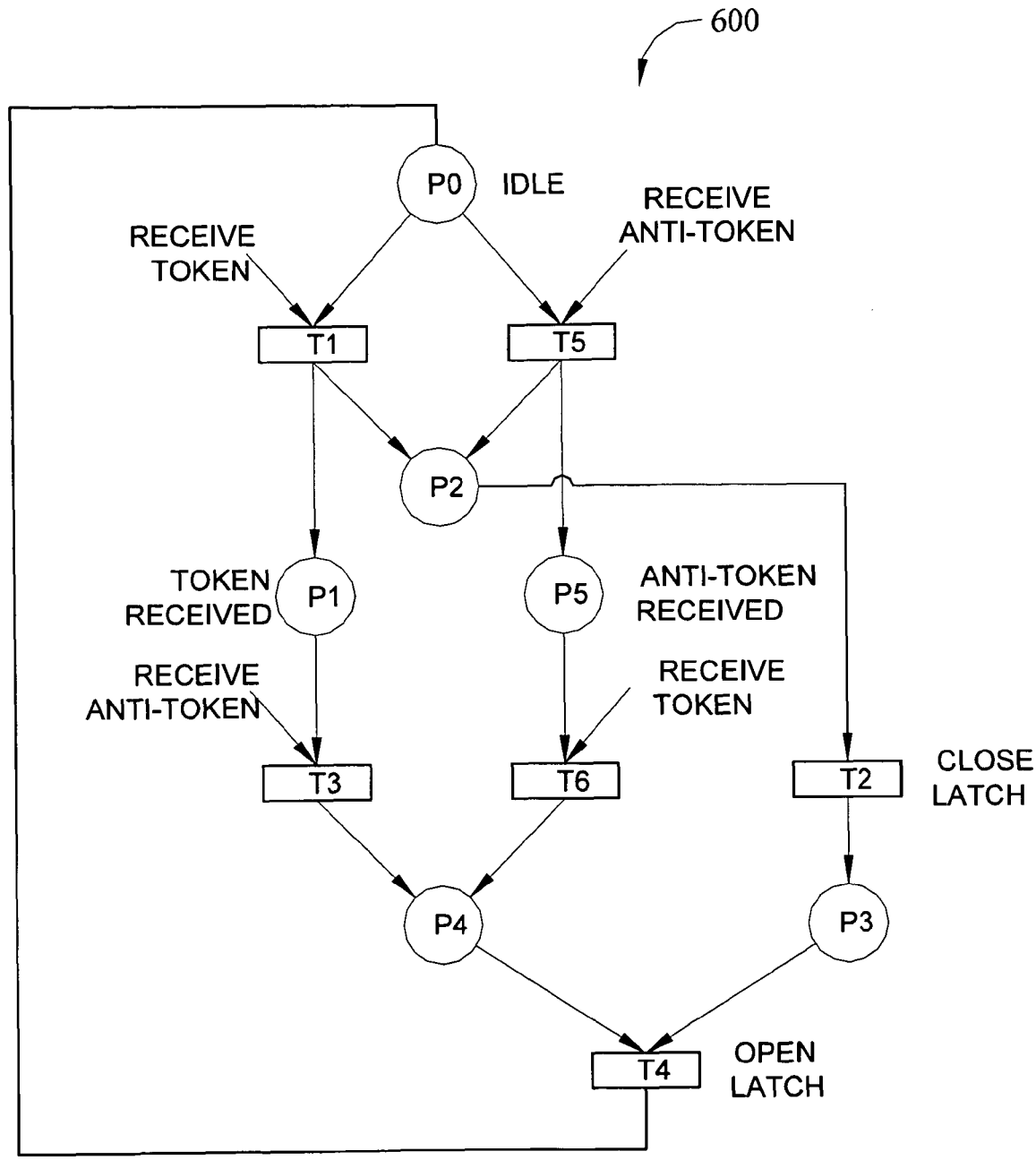
FIG. 6 is a Petri-net diagram (PND) illustrating an exemplary control protocol according to an embodiment of the subject matter describe herein.

FIG. 6 is a Petri-net diagram (PND) illustrating an exemplary control protocol according to an embodiment of the subject matter describe herein. Circles represent places, boxes represent transitions, and arrows represent directed arcs. For simplicity, each "place" in the PND may be conceptually treated similarly to a "state" in a state machine diagram. Unlike a state machine diagram, however, where only one state may be active at a time, multiple places in a PND may be occupied simultaneously. A place is "occupied" when the place contains a token, which are conceptual markers to indicate control flow through the PND. This characteristic makes Petri-net diagrams useful to describe distributed systems or systems with parallelism.

Each transition has one or more inputs and one or more outputs. Transitions may "fire" only when all of its inputs are occupied by tokens. When a transition fires, all of its outputs become occupied by tokens and its inputs are cleared of tokens. Thus, a transition is suggestive of a token transitioning from one place to another; however, all outputs get a token, regardless of how many inputs a transition has. In other words, Petri-net tokens are markers or indicators only, and not an entity of which there is a finite supply. To avoid confusion between a Petri-net token and the token/anti-token concept used to describe information flowing in a forward/backward direction within an asynchronous counterflow pipeline, a place in a PND that is occupied by a Petri-net token is hereinafter referred to as "armed". Thus, a transition cannot fire unless all of its input places are armed, and when a transition does fire, it arms all of its output places and disarms all of its input places.

By convention, all inputs to Petri-net transitions are places connected to the transition by directed arcs. For simplicity, however, some of the inputs to transitions in the PND illustrated in FIG. 6 are shown only as directed arcs, i.e., the place and trigger is not shown. These directed arcs are labeled with a description of an event that would have armed the un-shown place. Again, for simplicity, these directed arcs shown without places are herein referred to as "triggers"; thus, a transition will not fire unless it has been armed and triggered.

The PND illustrated in FIG. 6 includes the following restriction: a stage in a non-idle state cannot receive a new token or an anti-token until it has completely processed the existing token or anti-token. Completely processing a token/anti-token means sending the token/anti-token to the next/previous stage and receiving an acknowledgment. The inputs to the PND are signals indicating the receipt of a token and/or anti-token. The output of the PND is a latch control signal.

In the embodiment illustrated in FIG. 6, PND 600 includes place P0, which corresponds to a stage in the IDLE state, in which the latch is open, allowing data and request signals to flow transparently through the stage. If P0 is armed (i.e., the stage is in the IDLE state) receipt of a token by the stage, e.g., a transition on signal $F_{i-1}$ in FIG. 5, would cause transition T1 to fire. As a result of transition T1 firing, place P0 would be disarmed and places P1 and P2 would be armed. Place P1 corresponds to a state in which a stage has received a token but not an anti-token. Place P2 corresponds to a state in which a stage has received either a token or an anti-token.

Since place P2 is the only input to transition T2, transition T2 fires, arming place P3 and disarming place P2. Place P3 represents a state in which the stage's latch is closed, capturing data, and where an acknowledgement is sent to the previous stage and a request is sent to the next stage, i.e., a transition on both $F_i$ and $B_i$ in FIG. 5.

If place P1 is armed, receipt of an anti-token by the stage, e.g., a transition on signal $B_{i+1}$ in FIG. 5, would cause transition T3 to fire, arming place P4 and disarming place P1. If place P3 was previously armed, e.g., by receipt of a token prior to receipt of the anti-token, transition T4 will fire, disarming places P4 and P5 and arming place P0, where the latch will again open.

Starting again with place P0 in the armed state, if the stage receives an anti-token before receiving a token, transition T5 will fire, arming places P2 and P5, and disarming place P0. As described above, arming place P2 causes a sequence of transitions leading to place P3 being armed and the data latch being closed. Place P5 corresponds to a state in which a stage has received an anti-token but not a token. Once place P5 is armed, receipt of a token by the stage would cause transition T6 to fire, arming place P4 and disarming place P5. If place P3 was previously armed, e.g., by receipt of an anti-token prior to receipt of the token, transition T4 will fire, disarming places P4 and P5 and arming place P0, where the latch will again open.

Thus, from the IDLE state, whether the stage receives a token or anti-token first, the stage will respond by causing a transition on both the signal going to the next stage and the signal going to the previous stage, i.e., $F_i$ and $B_i$ in FIG. 5.

Figure 7:
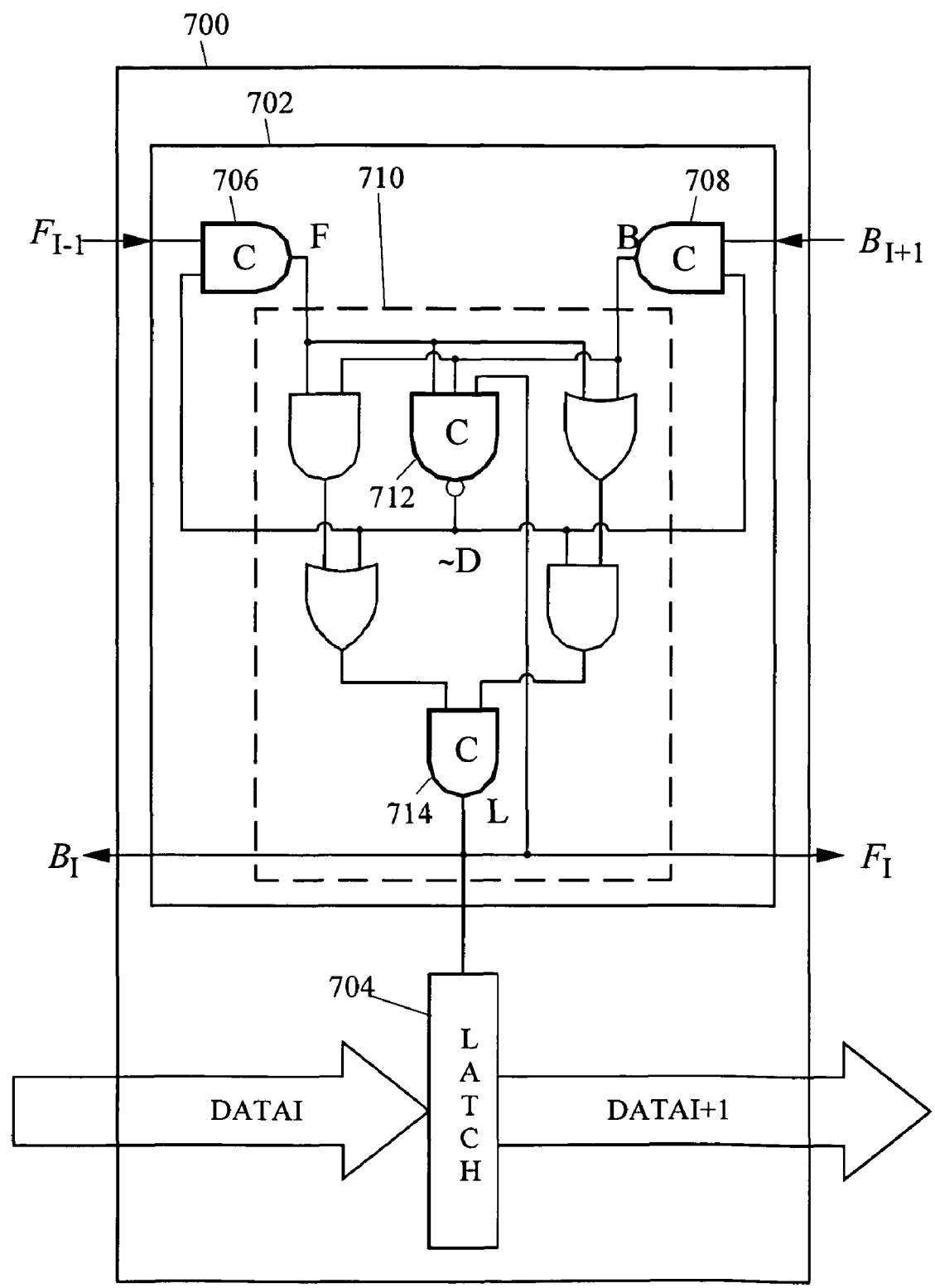
FIG. 7 illustrates an exemplary asynchronous counterflow pipeline stage according to an embodiment of the subject matter described herein.

FIG. 7 illustrates an exemplary asynchronous counterflow pipeline stage according to an embodiment of the subject matter described herein. In one embodiment, stage 700 consists of a controller 702 and data latch 704. Controller 702 controls the outgoing requests and acknowledgments through which the stages communicate. It also controls the enable signal L to data latch 704, controlling the data flow through the pipeline.

Controller 702 is implemented based on the Petri-net description of the protocol shown in FIG. 6. Since PND 600 represents only the restricted version, in which a stage cannot receive a new token or anti-token until the existing token or anti-token has been processed, extra logic called the guarding C-Elements 706 and 708 are added to controller 702 to complete the counterflow protocol.

A C-Element operates according to the following description: if all of the C-Elements inputs are the same value, the output of the C-Element becomes that value. Thus, if all inputs are logic "1", the output becomes logic "1", and if all inputs are logic "0", the output becomes logic "0". For any other combination of inputs, the C-Element does not change output value but instead maintains the last value that was output by the C-Element. This behavior makes the C-Element very useful for transition-based logic. The C-element may be modeled by an unclocked set/reset flip-flop, where the set input signal is a logical AND of all inputs to the C-element and the reset input signal is a logical AND of all inverted inputs to the C-element.

The guarding C-Elements 706 and 708 are provided on all the control inputs to the controller. They ensure that a new incoming token or anti-token is not accepted until acknowledgment to the previously forwarded token or anti-token has been received. The control inputs $F_{i-1}$, and $B_{i+1}$ are fed into their guarding C-Elements whose outputs, F and B respectively, are fed into the sub-circuit 710, which itself contains C-element 712 for generating signal D, and C-element 714 for generating latch-control signal L. Sub-circuit 710 represents one implementation of PND 600. Sub-circuit 710 can be generated either manually or using circuit generating tools. Table 2, below, contains equations to describe the function of sub-circuit 710:

TABLE 2

Boolean characteristic equations

| Signal | Set | Reset |
|--------|-----|-------|
| D | $F \times B \times L$ | $\overline{F} \times \overline{B} \times \overline{L}$ |
| L | $\overline{D} \times (F + B)$ | $D \times (\overline{F} + \overline{B})$ |

TABLE 3

States of a counterflow pipeline stage

| F | B | L | D | Controller State |
|---|---|---|---|------------------|
| ○ | ○ | ○ | ○ | Idle |
| ● | ○ | ○ | ○ | Accepted a token |
| ● | ○ | ● | ○ | Waiting for token ACK |
| ○ | ● | ○ | ○ | Accepted an anti-token |
| ○ | ● | ○ | ● | Waiting for anti-token ACK |
| ● | ● | ○ | ○ | Token anti-token clashed |

The states of these four signals indicate a specific state of the controller. In Table 3, above a signal has one value or another, arbitrarily indicated with either an open circle (○) or a closed circle (●). Because controller 702 implements a transition-based design rather than a level-based design, it is the relative, rather than absolute, logic level that is important. For example, in the Idle state, the signals F, B, L, and D all have the same value. This means that all of these signals may be at logic value "H" or that all of these signals may be at logic value "L". When signal F is a different value than signals B, L, and D, this indicates that the stage has accepted a token from a previous stage. When both signals F and L both have the same value and that value is different from the value on both B and D, this indicates that the stage has closed the latch, has forwarded the token to the next stage, and is waiting to receive an acknowledgement to the token from the next stage. Similarly, when signal B is a different value than signals F, L, and D, this indicates that the stage has accepted an anti-token from the next stage. When both signals B and D both have the same value and that value is different from the value on both F and L, this indicates that the stage has closed the latch, has forwarded the anti-token to the previous stage, and is waiting to receive an acknowledgement to the anti-token from the previous stage. Finally, when signals F and B both have the same value and that value is different from the value on both L and D, this indicates that the stage has received both a token and an anti-token at the same time.

The flow of tokens through the pipeline will now be described conceptually. Initially, when the pipeline is empty, all the stages are in idle state and all the signals are the same value. For this example, the signals are all assumed to be low. When the first token (data item) flows through, all request lines will toggle from low to high as the first token flows through the pipeline from left to right. When the token is at some intermediate stage, all the signals associated with pipeline stages prior to this stage are high and all the signals associated with later stages are low. When the token arrives at the other end of the pipeline, all the stages are high. When a second token flows through, all the signals are toggled back to low again. When tokens are fed into the left end of the pipeline continuously, the signal values of the pipeline stages alternate along the pipeline.

The flow of anti-tokens will cause exactly the same kind of behavior as in the case of tokens but from the other end of the pipeline. If an anti-token is injected in an empty pipeline having all signals low, the anti-token toggles all the signal lines from low to high as the anti-token flows through the pipeline from right to left. Once the anti-token reaches the other end of the pipeline, all signals have been toggled from low to high. A second flowing anti-token will toggle all the signals back to low. Now consider injecting a token and an anti-token simultaneously into the right and the left end of the pipeline respectively. As the token and anti-token travel towards each other, they leave all the signals toggled in their trail. Finally as they clash (i.e., arrive at the same stage) at some intermediate stage, they cancel each other and all the signals will be at level one. Injecting a second token/anti-token pair will bring back all the signals to zero after they clash at some intermediate stage. When a token and an anti-token clash, the clash is treated exactly the same way as if the anti-token was an acknowledgment to the token. Because a clash is treated the same way as a normal acknowledgment, there is no need for a complex arbiter circuit, thus simplifying the design.

Tokens and anti-tokens may both carry information, and may or may not be associated with data traveling through the pipeline. For example, in one embodiment, tokens are considered as data-carrying requests and anti-tokens as request killers. In this embodiment, anti-tokens are not associated with any data; they merely kill the first token they encounter along their path, killing themselves in the process. Therefore, in these embodiments, the latch may be enabled when a token is passing through but not when an anti-token is passing through. In an alternative embodiment, the counterflow pipeline can be designed to support data flow in either direction.

Data flow through latch 704 is controlled by the enable signal L. In one embodiment, latch 704 is normally open, e.g., transparent, and close as soon as data passes through. The idea is to disable the latch until the stage receives an acknowledgment to a token that the stage had sent. The behavior of a high-active enable signal can be described by the following equation:

enable=($L$ XNOR $B$).

However, keeping latches open all the time may allow any garbage (data with no associated request) to flow through the pipeline, wasting energy. The latches should then open only when there is an impending request (token). This behavior can be obtained using the following enable signal, designed to enable the latch only when there is an impending token and any previously sent token is acknowledged.

enable=($L$ XNOR $B$) AND ($F$ XOR $L$)

However, the above condition does not cover the anti-token case. When a stage is processing an anti-token, there is no need to open the latch in any case. So, we need to make sure the latch is not opened when F toggles in response to a sent anti-token. The enable signal can be modified to include this case:

enable=($L$ XNOR $B$) AND ($F$ XOR $L$) AND ($D$ XNOR $B$)

In the embodiment illustrated in FIG. 7, the latch control signal L will operate to open the latch only when a token arrives before an anti-token. Furthermore, the latch signal L feeds back into C-element 712, with the result that latch control signal L operates as a one-shot, opening the latch briefly before closing it again. Complicating the enable logic could lead to glitches which may temporarily open the latch and contaminate its contents. However, the timing of the input signals ensures that glitches do not occur when the stage is processing tokens. In the case of anti-tokens however, there is the possibility that a glitch may occur. It is important to note that these glitches do not effect the control behavior of the pipeline, but would only effect the data path. The only concern is any energy wastage due to contents of latch switching unnecessarily.

However, these potential glitches are not a problem except at the stage where a token and a anti-token clash. When an anti-token alone flows through the pipeline, the inputs and outputs of the latch match since the input has not changed since the last token has passed through. (The values of the latch in particular stage are updated with the data associated with the token that passes through). Hence, even though a rare glitch may occur on the enable signal, this does not result in any changes in latch contents as the inputs and outputs are the same. This situation is different, however, at the token anti-token clash stage because the input data will be that which is associated with the token. A glitch may result in a change to some of the contents of the latch. This is of no consequence, however, since the arrival of an anti-token signifies that the operation currently being performed by the branch is to be terminated; thus, the potentially corrupted contents of the latch will be discarded in any case.

Figure 1:
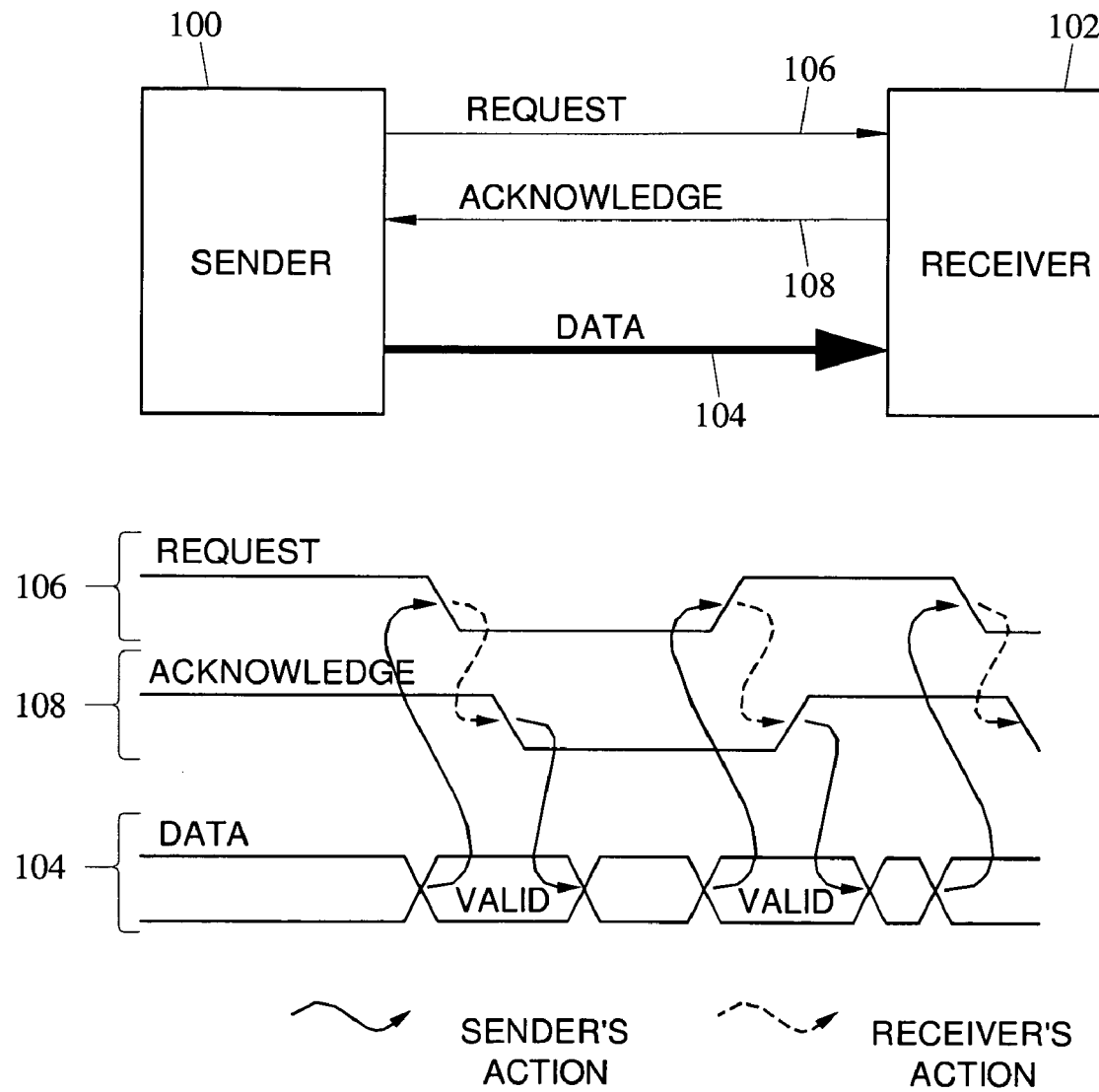
FIG. 1 is a block diagram illustrating a conventional pipeline that uses bundled data with a transition signaled handshake protocol to control data transfers.
Figure 2:
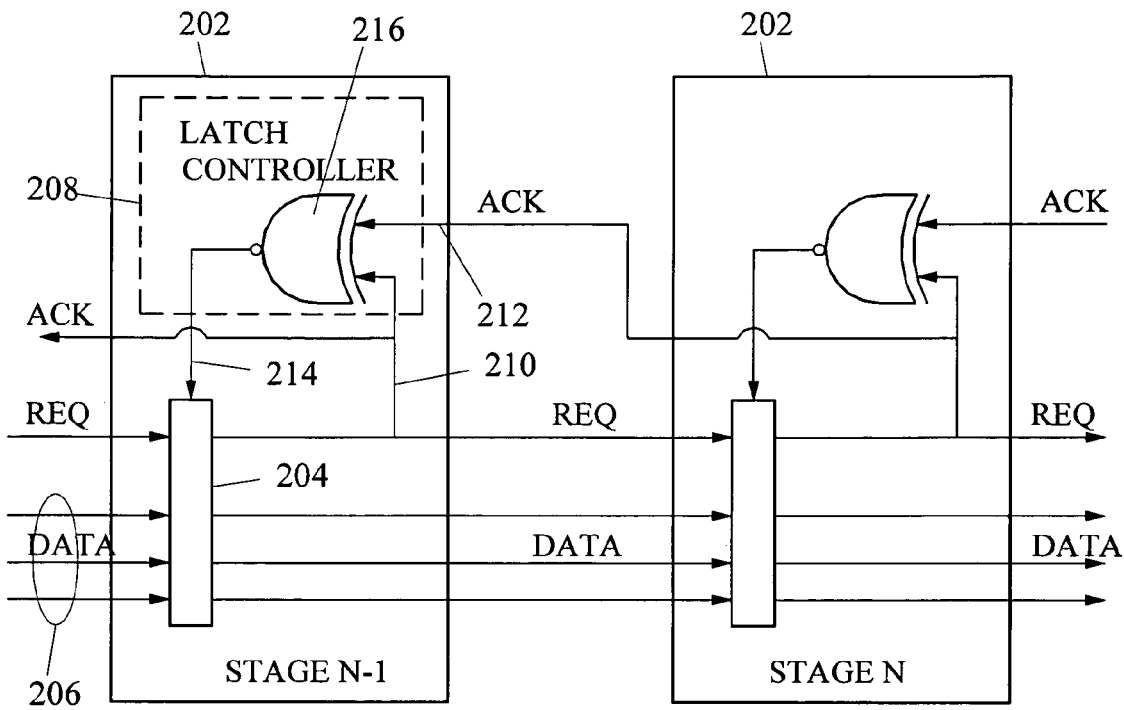
FIG. 2 is a block diagram illustrating a conventional transition signaling asynchronous pipeline implementation.
Figure 3:
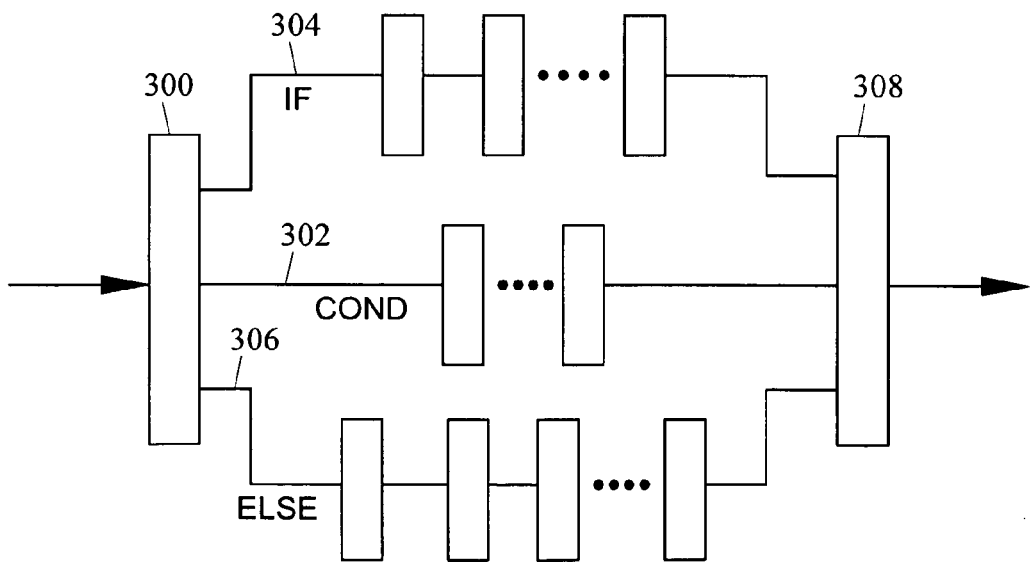
FIG. 3 is a block diagram illustrating an abstract picture of a conventional design that implements speculation but not preemption or early evaluation.
Figure 4:
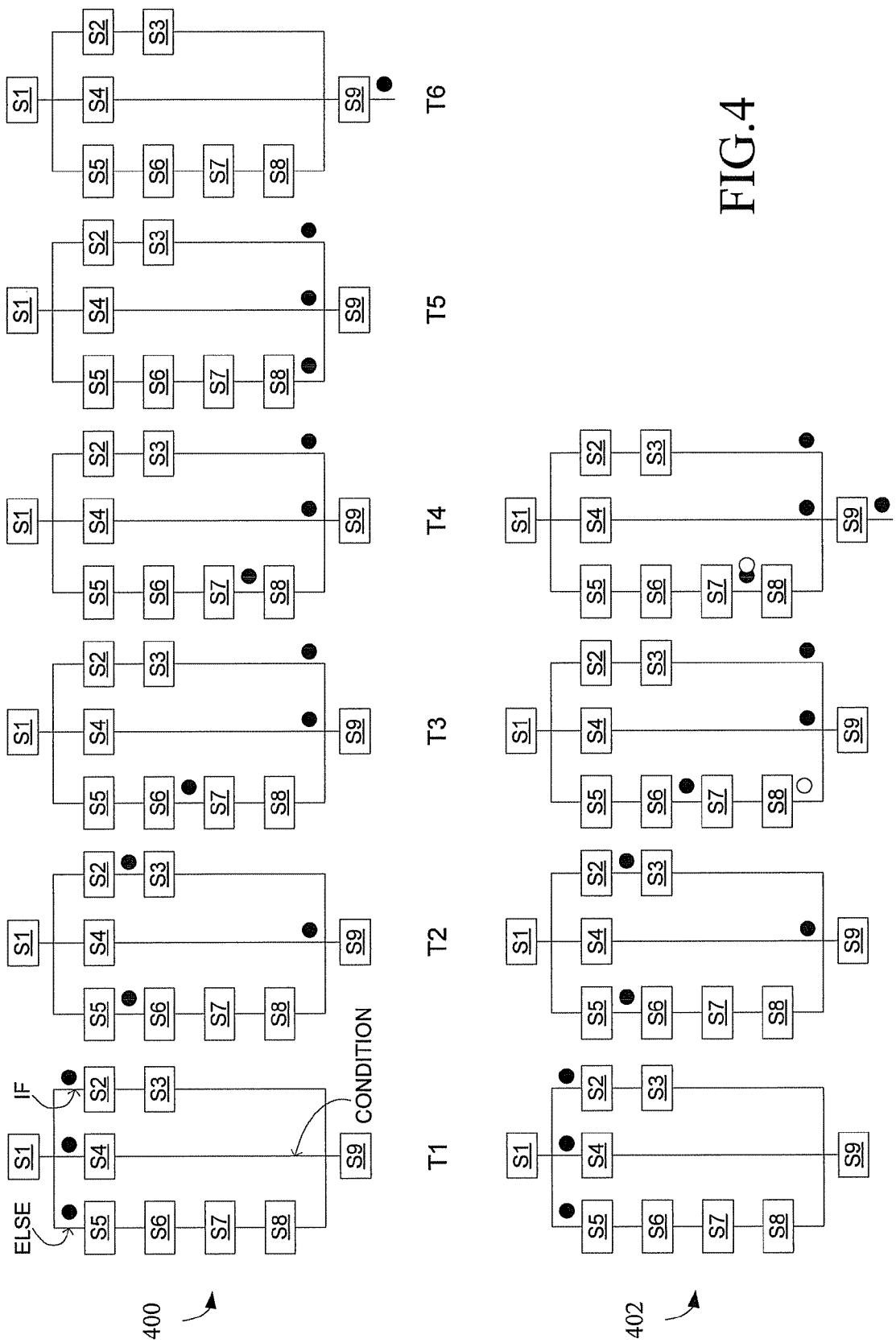
FIG. 4 is a block diagram comparing the operation of a conventional pipeline without anti-tokens to the operation of a conventional counterflow pipeline which uses anti-tokens to implement preemption, illustrating the problem of metastability suffered by conventional counterflow pipeline designs.

The asynchronous counterflow pipeline architecture described herein can be used to implement parallel pipeline designs. When an operation is split into multiple, parallel branches, the pipeline is said to "fork". When the results of the parallel branches are merged, the pipeline is said to "join". This is illustrated in FIG. 3, which includes a fork stage 300 and a join stage 308. In general, a fork is a stage which accepts a request and forwards it to two or more output stages, and a join is a stage which accepts request from two or more input stages and passes on a single request to the output stage.

A join stage that does not support eager evaluation will wait until it receives the request from all the input stages before forwarding the request to the next stage. In contrast, a join stage according to embodiment of the subject matter described herein will generate an output took as soon as there are a sufficient number of input tokens to determine the output.

A join stage that does not support preemption will not interrupt or terminate the processes that the join stage has determined are unneeded but are still being performed by a parallel input branch. In contrast, a join stage according to an embodiment of the subject matter described herein will also send anti-tokens down the join stage's unneeded input branches. In FIG. 3, for example, join stage 308 may issue an anti-token into either IF branch 304 or ELSE branch 306, depending on the result of the CONDITION branch 302.

Figure 8:
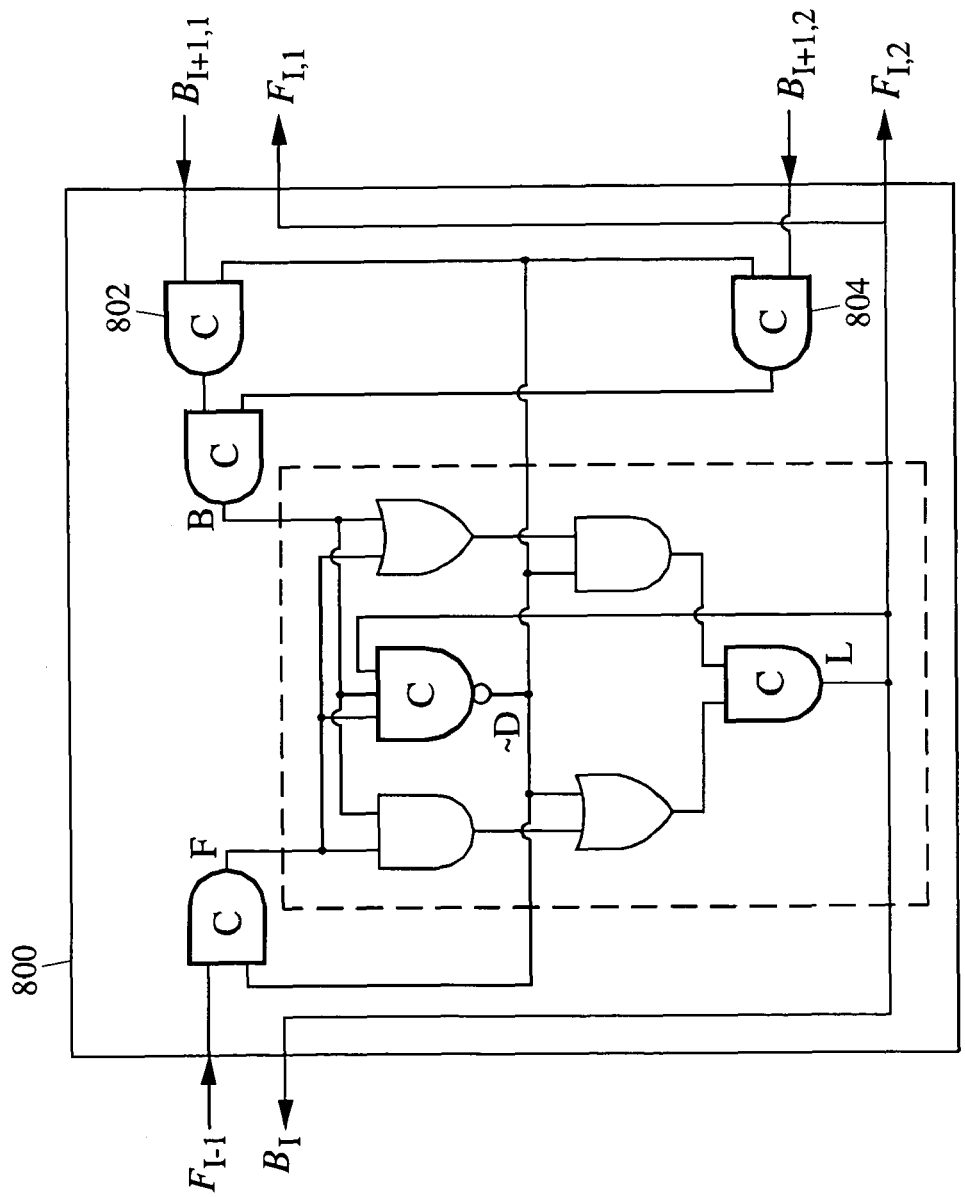
FIG. 8 illustrates an exemplary asynchronous counterflow pipeline fork stage according to an embodiment of the subject matter described herein.

FIG. 8 illustrates an exemplary asynchronous counterflow pipeline fork stage according to an embodiment of the subject matter described herein. In one embodiment, a fork stage 800 may be very similar to the general pipeline stage 700 shown in FIG. 7, but with additional circuitry, guarding C-elements 802 and 804, to combine all incoming B signals. This ensures that when fork stage 800 forwards a token to multiple output stages, fork stage 800 will wait until all acknowledgements arrive before it can accept a new token. Similarly, when fork stage 800 receives an anti-token from one of its output stages, it waits until it receives anti-tokens from all of the output stages before fork stage 800 will send the anti-token backwards to its input stage(s).

Figure 9:
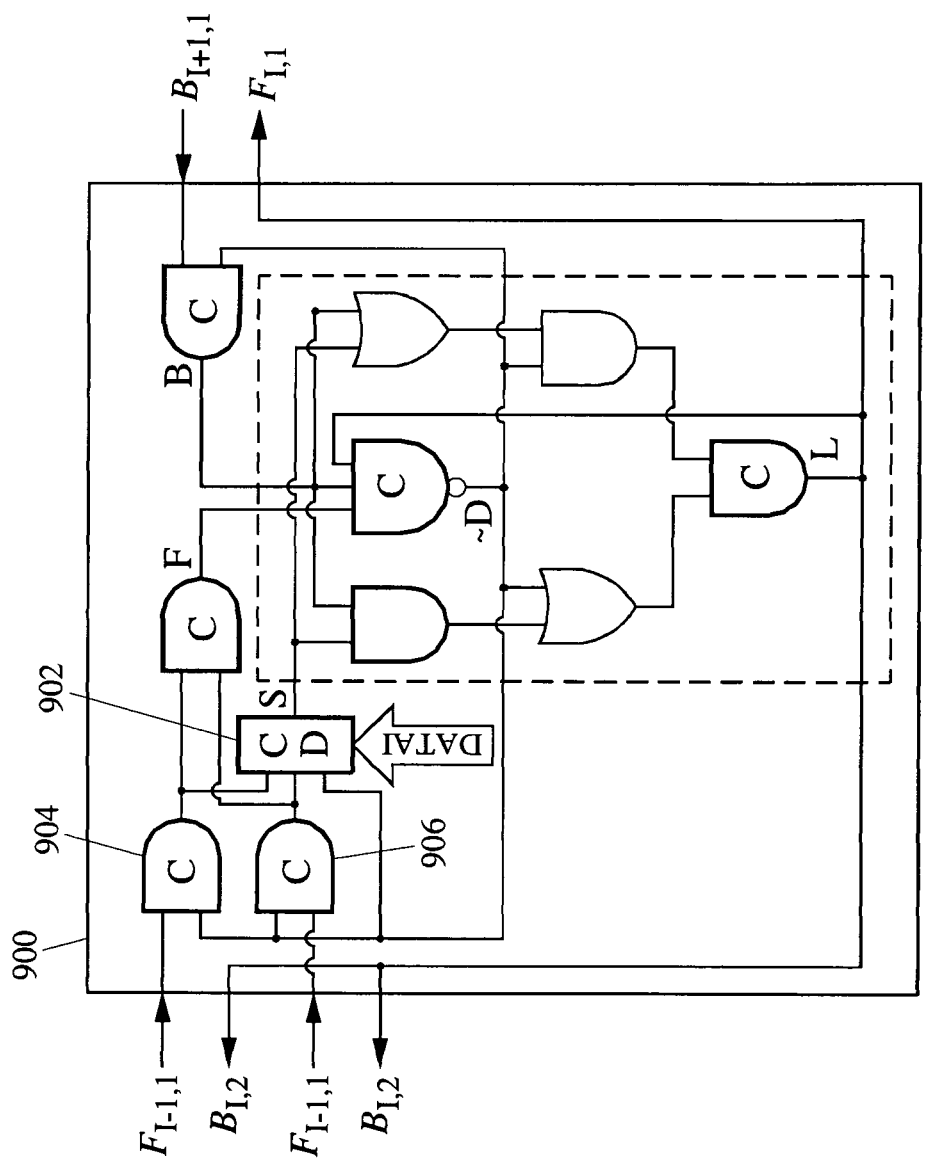
FIG. 9 illustrates an exemplary asynchronous counterflow pipeline join stage according to an embodiment of the subject matter described herein.

FIG. 9 illustrates an exemplary asynchronous counterflow pipeline join stage according to an embodiment of the subject matter described herein. In one embodiment, a join stage 900 may be very similar to the general pipeline stage 700 shown in FIG. 7, but with a join controller 902 that includes additional circuitry, guarding C-elements 904 and 906, to combine all incoming F signals. However, in order to support eager evaluation and/or preemption, join stage 900 must also include a completion detection circuit CD 908 for determining whether the inputs received are sufficient to compute the output. The output of detection circuit CD 908 is signal S, indicating that the inputs are sufficient for the stage to take action. Table 4, below, contains equations to describe the function of join controller 902.

TABLE 4

Boolean characteristic equations

| Signal | Set | Reset |
|---|---|---|
| D | F × B × L | $\overline{F} \times \overline{B} \times \overline{L}$ |
| L | $\overline{D} \times (S + B)$ | $D \times (\overline{S} + \overline{B})$ |

Once the input is determined to be sufficient to generate an output, join stage 900 may generate the outgoing token, acknowledgements down the input branches with valid inputs, and anti-tokens along the input branches with invalid inputs. The completion detector logic depends on the specific logic implemented by the join stage. One such example, and IF-THEN-ELSE join stage, will now be described.

Figure 10:
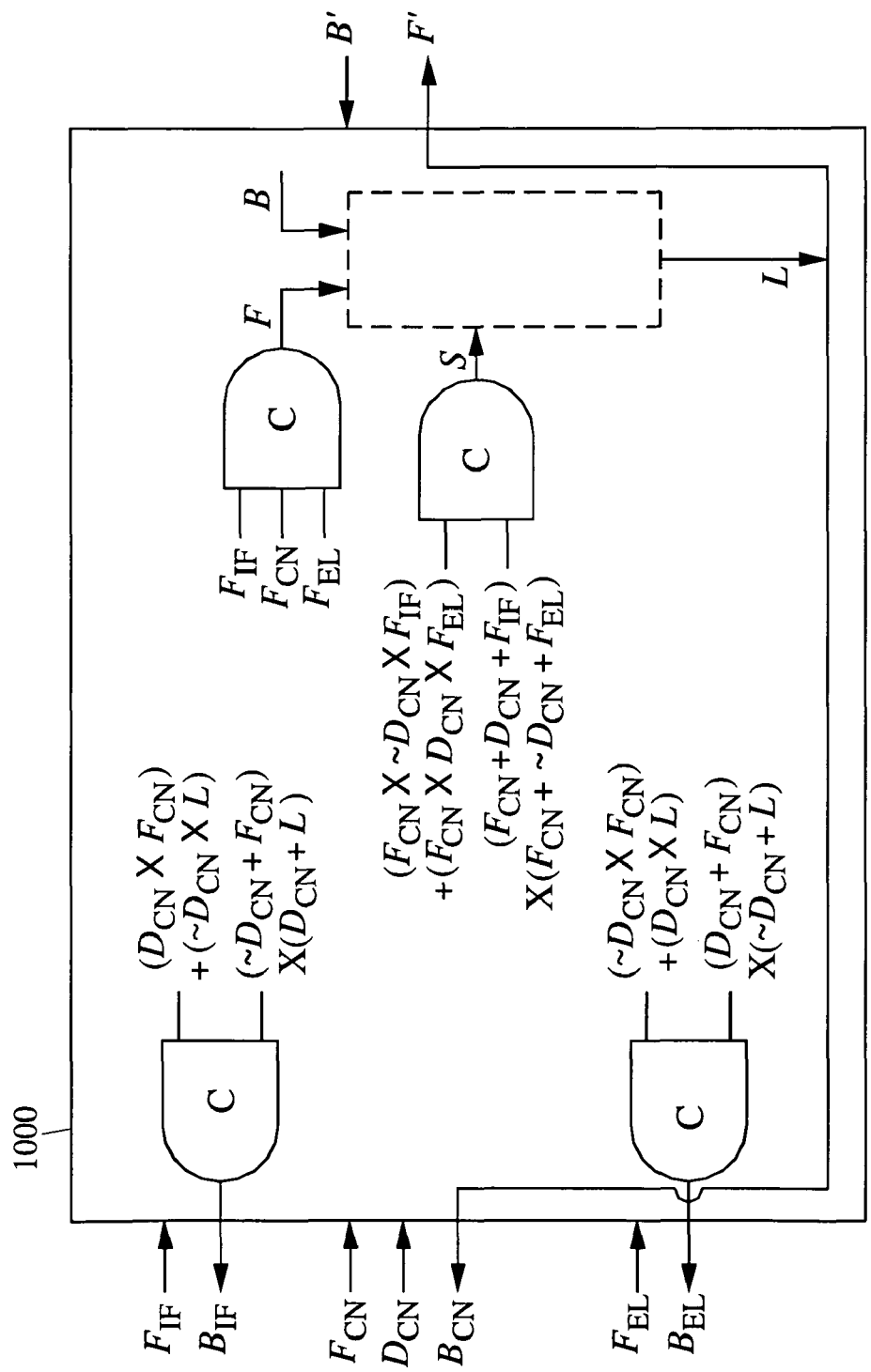
FIG. 10 illustrates an exemplary asynchronous counterflow pipeline IF-THEN-ELSE join stage according to an embodiment of the subject matter described herein.

FIG. 10 illustrates an exemplary asynchronous counterflow pipeline IF-THEN-ELSE join stage according to an embodiment of the subject matter described herein. In one embodiment, a join stage 1000 may be very similar to the general pipeline stage 700 shown in FIG. 7, but with a join controller 1002 that implements an IF-THEN-ELSE construct where an extra optimization can be applied: the anti-token can be generated along an unwanted branch even before the token to the next stage is generated. This is possible because once the condition bit is evaluated, the join can immediately send an anti-token along the unwanted branch. In the embodiment illustrated in FIG. 10, however, join controller 1002 must wait until the input on the desired branch has arrived before join controller 1002 can produce an outgoing token. While this optimization does not necessarily save time, it helps in killing computation along the unwanted branch by producing an early anti-token.

In the embodiment illustrated in FIG. 10, some circuit details evident in the previously described general join stage are avoided for clarity. The if-then-else join has 3 input channels: the IF branch, with control signals $F_{IF}$ and $B_{IF}$; the ELSE branch, with control signals $F_{ELSE}$ and $B_{ELSE}$; and the CONDITION evaluation branch, with control signals $F_{CN}$ and $B_{CN}$. Join controller 1002 also has the condition bit $D_{CN}$ as input, used in the completion detector logic. For this specific join, the completion detector can be implemented as follows.

First, a truth table specifying the output S (sufficiency signal) is drawn for a given set of inputs—$F_{CN}$, $D_{CN}$, $F_{IF}$ and $F_{ELSE}$. Table 5, below, summarizes the different cases. The logic can be implemented using a C-Element with input set and ~reset.

TABLE 5

Determining the Completion Detector Logic

| $F_{CN}$ | $D_{CN}$ | $F_{IF}$ | $F_{ELSE}$ | S |
|---|---|---|---|---|
| 0 | 0 | 0 | — | 0 |
| 1 | 0 | 1 | — | 1 |
| 0 | 1 | — | 0 | 0 |
| 1 | 1 | — | 1 | 1 |

The same of approach described above can be used to generate logic that produce early anti-tokens. The Table 6, and Table 7, below, determine the logic required for the $B_{IF}$ and $B_{el}$ signals respectively.

TABLE 6

Determining Logic to Compute $B_{IF}$

| $D_{CN}$ | $F_{CN}$ | I | $B_{IF}$ |
|---|---|---|---|
| 1 | 1 | — | 1 |
| 1 | 0 | — | 0 |
| 0 | — | 1 | 1 |
| 0 | — | 0 | 0 |

TABLE 7

Determining Logic to Compute $B_{el}$
Table 5.3:

| $d_{cn}$ | $f_{cn}$ | I | $B_{el}$ |
|---|---|---|---|
| 0 | 1 | — | 1 |
| 0 | 0 | — | 0 |
| 1 | — | 1 | 1 |
| 1 | — | 0 | 0 |

Figure 11:
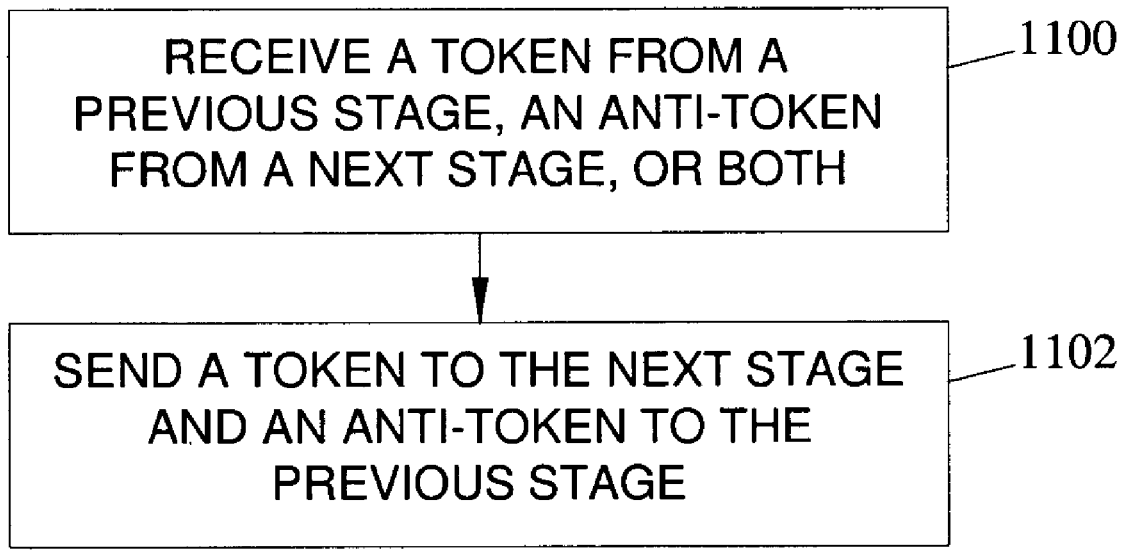
FIG. 11 is a flow chart illustrating an exemplary process for preemption in asynchronous systems using anti-tokens according to an embodiment of the subject matter described herein.

FIG. 11 is a flow chart illustrating an exemplary process for preemption in asynchronous systems using anti-tokens according to an embodiment of the subject matter described herein. In block 1100, at an arbiter-less asynchronous pipeline stage for receiving tokens sent in a forward direction from a previous stage, receiving anti-tokens sent in a backward direction from a next stage, sending anti-tokens in a backward direction to the previous stage, and sending tokens in a forward direction to the next stage, a token from the previous stage, an anti-token from the next stage, or both, is received. At block 1102, in response to receiving the token, the anti-token, or both, a token is sent to the next stage and an anti-token is sent to the previous stage. In one embodiment, the simultaneous arrival of both a token from the previous stage and an anti-token from the next stage also causes a token to be sent to the next stage and an anti-token to be sent to the previous stage.

Architectural templates may be based on the counterflow idea to support speculation, preemption and eager evaluation in asynchronous pipelined systems. Adoption of the counterflow concepts can provide a significant improvement in the throughput of certain classes of systems, e.g., those involving conditional computation, where a bottleneck pipeline stage can often be preempted if its result is determined to be no longer required. Experimental results indicate that the counterflow approach can improve the system throughput by a factor of up to 2.2×, along with an energy savings of up to 27%.

A group of experiments were designed to determine the effectiveness of using anti-tokens with speculation and eager evaluation and to compare the performance of pipelines with and without those capabilities. To this end, a library of modules required for implementation of asynchronous counterflow pipelines was developed. These modules were designed at behavioral and structural level using Verilog language. A unit delay was assumed to be the latency of a two input C-Element. The energy consumption per toggle was assumed to be of 1 unit in a C-Element. The energy consumption per enable on a latch was assumed to be 32 units (considering a 32 bit latch). The experiments compared the throughput and power consumption of two asynchronous pipeline, one without preemption and early evaluation (pipeline1) and one without (pipeline2).

A simple IF-THEN-ELSE statement was rendered using the library of modules. The CONDITION evaluation operation consists of a single pipeline stage. The IF branch has 2 pipeline stages and the ELSE branch has 8 pipeline stages. The pipeline stages are assumed to be associated with logic of uniform delay of five units. The latches are enabled only when tokens pass through. The first set of experiments was intended to determine the effects, if any, that various probabilities of taking the IF branch had on throughput and energy savings. In each case, total time taken to complete 1000 simulations was observed.

Pipeline1 took 3.2 microseconds to complete 1000 simulations. Because pipeline1 does not support preemption or early evaluation, varying this probability of taking the IF branch does not affect the total time taken for the pipeline1 because the join stage has to wait until it receives all inputs from both the if and else branches before generating the output.

Table 8, below, summarizes the results for pipeline2. The first column indicates $R_{IF}$—probability that if branch is taken. The second column indicates the total time taken by pipeline2 to run 1000 simulations. The third column lists the total energy consumed in each case. The fourth column shows the throughput improvement with respect to pipelines. The final column shows the energy savings with respect to pipeline1. Pipeline1 consumed $33 \times 10^4$ units of energy for 1000 simulations.

TABLE 8

Pipeline2 Performance Versus $R_{IF}$

| $R_{if}$ | Time (μsec) | Energy ($10^4$) units | Normalized Throughput | Energy Savings (%) |
|---|---|---|---|---|
| 5 | 3.36 | 35.94 | 0.95 | −8.90 |
| 10 | 3.29 | 35.30 | 0.98 | −6.96 |
| 20 | 3.17 | 34.62 | 1.01 | −4.92 |
| 30 | 3.05 | 33.91 | 1.05 | −2.77 |

TABLE 8-continued

Pipeline2 Performance Versus $R_{IF}$

| $R_{if}$ | Time (μsec) | Energy ($10^4$) units | Normalized Throughput | Energy Savings (%) |
|---|---|---|---|---|
| 40 | 2.91 | 33.06 | 1.10 | −0.17 |
| 50 | 2.72 | 31.88 | 1.18 | 3.40 |
| 60 | 2.49 | 30.52 | 1.29 | 7.51 |
| 70 | 2.26 | 29.15 | 1.42 | 11.66 |
| 80 | 1.97 | 27.32 | 1.63 | 17.21 |
| 90 | 1.67 | 25.45 | 1.93 | 22.87 |
| 95 | 1.45 | 24.10 | 2.22 | 26.98 |

At very low probabilities, e.g., around 5%, the extra overhead introduced in reverse latency may outweigh the possible benefits of using the counter-flowing anti-tokens. At probabilities around 20%, the throughput of both the protocols is almost the same. However, with the $R_{IF}$ equal to 50% and more, the savings in throughput increase significantly. When the smaller branch is taken with very high probability, the throughput of the counterflow pipeline more than doubles for this specific application. The energy savings also show a similar trend, with up to a 26% energy savings when the smaller branch is taken with high probability.

In another experiment, the effect of varying arrival times of the IF and ELSE branches was tested. This was done by varying the number of pipeline stages of the ELSE branch with respect to the number of stages of the IF branch. Table 9, below, summarizes the results of five cases with assumed $R_{IF}$ value 70%.

TABLE 9

Effect of Varying Arrival Times

| $N_{IF}$ | $N_{ELSE}$ | $t_{cFlow}$ (μsec) | $t_{MT}$ (μsec) | Normalized Throughput |
|---|---|---|---|---|
| 2 | 2 | 1.29 | 1.10 | 0.86 |
| 2 | 4 | 1.61 | 1.81 | 1.12 |
| 2 | 6 | 1.94 | 2.51 | 1.29 |
| 2 | 8 | 2.26 | 3.21 | 1.42 |
| 2 | 10 | 2.59 | 3.91 | 1.51 |

Columns $N_{IF}$ and $N_{ELSE}$ indicate the number of stages in the IF and the ELSE branches respectively. As expected, the relative effectiveness of pipeline2 improves as the arrival times of the IF and ELSE branches differ more.

Often, there are high latency logic blocks in complex systems which cannot be pipelined. In these cases, a whole pipeline stage may be devoted for the computation of these high latency logic blocks. The performance of the asynchronous counterflow pipeline designs described herein was evaluated for use in these kinds of applications. A completion detector supporting eager evaluation was coupled with a two-input join which requires at least the input from the smaller branch (i.e., the branch with fewer computations or which otherwise completed its sequence of operations before the other branch) to compute the output. Sometimes, input form the smaller branch is alone sufficient to compute the output and sometimes both the inputs are required.

The chance of smaller branch being alone sufficient is represented by $R_{SM}$. The smaller branch has 2 pipeline stages, the larger branch has 5 pipeline stages with one of the stages having a high latency logic block. In one experiment, the large block stage is in the middle of the slower branch. A latency of 40 units is assumed for the large block and 5 units for all the other stages. Also the energy consumed by the large block is assumed to be 100 units. The total time taken and the energy used by pipeline2 in each case are compared to the performance of pipelines, which took 4 micro seconds to run 1000 simulations and consumed 30×10$_4$ units of energy in the process. The results are shown in Table 10, below.

TABLE 10

Early Output Logic Using Counterflow Protocol

| $R_{sm}$ | Time (μsec) | Energy (10$^4$ units) | Normalized Throughput | Energy Savings (%) |
|---|---|---|---|---|
| 5 | 4.37 | 31.74 | 0.92 | −6.17 |
| 10 | 4.31 | 31.41 | 0.93 | −5.04 |
| 20 | 4.18 | 31.37 | 0.96 | −4.93 |
| 30 | 4.03 | 30.10 | 1.00 | −0.67 |
| 40 | 3.83 | 29.52 | 1.05 | 1.28 |
| 50 | 3.60 | 28.82 | 1.11 | 3.61 |
| 60 | 3.36 | 28.15 | 1.19 | 5.84 |
| 70 | 3.10 | 27.49 | 1.29 | 8.05 |
| 80 | 2.83 | 26.83 | 1.41 | 10.27 |
| 90 | 2.57 | 26.23 | 1.56 | 12.28 |
| 95 | 2.40 | 25.80 | 1.67 | 13.71 |

The results indicate a throughput improvement of 1.5× and a 13% improvement in energy usage for very high rates of $R_{SM}$, i.e., only the smaller branch input is sufficient most of the time to compute the output. However, at low values of $R_{SM}$, we see that the counterflow protocol is not effective in improving the throughput. This is largely because of the huge cycle time overhead introduced by the large block. This limits the rate at which anti-tokens (or tokens) can flow through the pipeline.

In addition, how the placement of the large block could affect the performance of the asynchronous counterflow protocol described herein was also tested. The same application above was taken and the large block in the slower branch was moved from one end to the other. It is assumed that the smaller branch results are sufficient to compute the output for 70% of the time. The results are summarized in Table 11, below. The first column indicates the placement of the large block in the slower branch. Position 1 indicates that the large block is the first stage (out of five) in the slower branch.

TABLE 11

Effect of Placement of Large Block

| Position | Time (μsec) | Energy (10$^4$ units) | Normalized Throughput | Energy Savings (%) |
|---|---|---|---|---|
| 1 | 3.8056 | 23.57 | 1.05 | 21.16 |
| 2 | 3.0082 | 24.83 | 1.33 | 16.97 |
| 3 | 3.0966 | 27.49 | 1.29 | 8.05 |
| 4 | 3.0966 | 29.73 | 1.29 | 0.55 |
| 5 | 3.3124 | 32.00 | 1.21 | −7.02 |

It can be seen that the throughput is best when the large block is at some intermediate stage. This is because the tokens and anti-tokens have some buffer to fill in before getting saturated with the cycle time of the large block. This helps in reducing the average cycle time to propagate anti-tokens. Considering energy savings, the case when the large block is far from the join stage gives the best energy savings because as this allows the least number of unwanted tokens to pass through the other four intermediate stages.

It will be understood that various details of the subject matter described herein may be changed without departing from the scope of the subject matter described herein. Furthermore, the foregoing description is for the purpose of illustration only, and not for the purpose of limitation.

What is claimed is:

1. A configurable system for constructing asynchronous application specific integrated data pipeline circuits with preemption, the system comprising:
    a plurality of modular circuit stages that are connectable with each other and with other circuit elements to form multi-stage asynchronous application specific integrated data pipeline circuits for asynchronously sending data and tokens in a forward direction through the pipeline and for asynchronously sending anti-tokens in a backward direction through the pipeline, wherein each stage is configured to perform a handshaking protocol with other pipeline stages, the protocol comprising sending a token forward to the next stage and sending an anti-token backward to the previous stage in response to receiving a token from the previous stage and in response to receiving an anti-token from the next stage.

2. The system of claim 1 wherein the module circuit stages each include:
    a data latch for receiving data sent forward from a previous stage and for transmitting the data forward to a next stage, the data latch having an open mode wherein data is passed transparently forward from the previous stage to the next stage, and a closed mode wherein the data from the previous stage is stored by the data latch and the stored value is transmitted forward to the next stage; and
    a controller for controlling the mode of the data latch and for performing the handshaking protocol.

3. The system of claim 1 wherein the modular circuit stages each include sets of logic gates connected to each other for implementing a set of behaviors, the behaviors including at least one of fork, join, speculation, preemption, and eager evaluation.

4. An asynchronous pipeline stage using anti-tokens for preemption, the asynchronous pipeline stage comprising:
    a data latch for receiving input data and transmitting output data in a forward direction, the data latch having an open mode wherein the input data is passed transparently through the data latch to form output data, and a closed mode wherein the input data is stored by the data latch and the stored data is transmitted to form output data; and
    a controller for controlling the mode of the data latch and for performing a handshaking protocol with other pipeline stages connectable to the asynchronous pipeline stage, the protocol comprising outputting a token in a forward direction and outputting an anti-token in a backward direction in response to receiving as input a token moving in a forward direction and in response to receiving as input an anti-token moving in a backward direction.

5. The stage of claim 3 wherein the input data and the token moving in a forward direction are received from a previous stage, the output data and the token moving in a forward direction are sent to a next stage, the anti-token moving in a backward direction is received from the next stage, and the anti-token moving in a backward direction is sent to a previous stage.

6. The stage of claim 3 wherein controlling the mode of the data latch includes closing the data latch when the token moving in a forward direction is received before the anti-token moving in a backward direction has been received, and opening the data latch upon subsequent receipt of the anti-token moving in a backward direction.

7. The stage of claim 3 wherein controlling the mode of the data latch includes maintaining the data latch in a closed mode except when capturing data, wherein capturing data comprises opening then closing the data latch, and wherein capturing data is performed in response to receiving the token moving in a forward direction before receiving the anti-token moving in a backward direction.

8. The stage of claim 3 comprising sets of logic gates connected to each other for implementing a set of behaviors, the behaviors including at least one of fork, join, speculation, preemption, and eager evaluation.

9. A method for preemption in asynchronous systems using anti-tokens, the method comprising:
   at an asynchronous pipeline stage for receiving tokens sent in a forward direction from a previous stage, receiving anti-tokens sent in a backward direction from a next stage, sending anti-tokens in a backward direction to the previous stage, and sending tokens in a forward direction to the next stage:
      in response to receiving a token from the previous stage, sending a token to the next stage and sending an anti-token to the previous stage, and, in response to receiving an anti-token from the next stage, sending a token to the next stage and sending an anti-token to the previous stage.

10. The method of claim 9 comprising at a data latch for receiving input data and transmitting output data in a forward direction, the data latch having an open mode wherein the input data is passed transparently through the data latch to form output data, and a closed mode wherein the input data is stored by the data latch and the stored data is transmitted to form output data:
   setting the data latch to closed mode when the token moving in a forward direction is received before the anti-token moving in a backward direction has been received; and
   setting the data latch to open mode upon subsequent receipt of the anti-token moving in a backward direction.

11. The method of claim 9 comprising at a data latch for receiving input data and transmitting output data in a forward direction, the data latch having an open mode wherein the input data is passed transparently through the data latch to form output data, and a closed mode wherein the input data is stored by the data latch and the stored data is transmitted to form output data, maintaining the data latch in a closed mode except when capturing data, wherein capturing data comprises opening then closing the data latch, and wherein capturing data is performed in response to receiving the token moving in a forward direction before receiving the anti-token moving in a backward direction.

* * * * *